US009736053B2

United States Patent
Zhang et al.

(10) Patent No.: US 9,736,053 B2
(45) Date of Patent: Aug. 15, 2017

(54) LAYER 2 PATH TRACING THROUGH CONTEXT ENCODING IN SOFTWARE DEFINED NETWORKING

(71) Applicant: NEC Laboratories America, Inc., Princeton, NJ (US)

(72) Inventors: Hui Zhang, Princeton Junction, NJ (US); Cristian Lumezanu, Princeton Junction, NJ (US); Junghwan Rhee, Princeton, NJ (US); Nipun Arora, Plainsboro, NJ (US); Qiang Xu, East Windsor, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 42 days.

(21) Appl. No.: 14/665,069

(22) Filed: Mar. 23, 2015

(65) Prior Publication Data

US 2015/0281076 A1    Oct. 1, 2015

Related U.S. Application Data

(60) Provisional application No. 61/969,960, filed on Mar. 25, 2014.

(51) Int. Cl.
*H04L 12/751* (2013.01)
*H04L 12/715* (2013.01)
*H04L 12/721* (2013.01)

(52) U.S. Cl.
CPC ............. *H04L 45/02* (2013.01); *H04L 45/64* (2013.01); *H04L 45/70* (2013.01)

(58) Field of Classification Search
CPC ......... H04L 43/10; H04L 43/00; H04L 43/12; H04L 43/106; H04L 45/00; H04L 45/26; H04L 45/02; H04L 45/28; H04L 45/66; H04L 45/72; H04L 45/64; H04L 45/70;
(Continued)

(56) References Cited

U.S. PATENT DOCUMENTS

| 6,538,997 B1 * | 3/2003 | Wang | H04L 12/462 370/241 |
| 7,149,794 B1 * | 12/2006 | Attili | H04L 45/00 709/223 |

OTHER PUBLICATIONS

Snoeren, A. C., Partridge, C., Sanchez, L. A., Jones, C. E., Tchakountio, F., Kent, S. T., and Strayer, W. T. Hash-based ipa traceback. In Proceedings of the 2001 Conference on Applications, Technologies, Architectures, and Protocols for Computer Communications (New York, NY, USA, 2001), SIGCOMM '01, ACM.
(Continued)

*Primary Examiner* — Kwang B Yoa
*Assistant Examiner* — Ricardo Castaneyra
(74) *Attorney, Agent, or Firm* — Joseph Kolodka

(57) ABSTRACT

A computer implemented method for network monitoring includes providing network packet event characterization and analysis for network monitoring that includes supporting summarization and characterization of network packet traces collected across multiple processing elements of different types in a virtual network, including a trace slicing to organize individual packet events into path-based trace slices, a trace characterization to extract at least 2 types of feature matrix describing those trace slices, and a trace analysis to cluster, rank and query packet traces based on metrics of the feature matrix.

16 Claims, 5 Drawing Sheets

(58) Field of Classification Search
CPC ... H04L 41/12; H04L 41/0677; H04L 41/145; H04L 69/22
See application file for complete search history.

(56) References Cited

OTHER PUBLICATIONS

Handigol, N., Heller, B., Jeyakumar, V., Mazi_eres, D., and McKeown, N. Where is the debugger for my software-de_ned network? in Proceedings of the First Workshop on Hot Topics in Software Defined Networks (New York, NY, USA, 2012), HotSDN '12, ACM, pp. 55{60.

* cited by examiner

101 - User Interface
102 - Encoder
103 - Decoder
201 - DAG Generation
202 - Path ID Generation
203 - Codebook Generation
204 - OpenFlow Entry Generation

| Time period T | | |
|---|---|---|
| ID | Site | Path |
| 00 | 6 | 1->2->3->5->6 |
| 00 | 7 | 1->2->3->5->7 |
| 00 | 1 | 6->5->3->2->1 |
| 10 | 6 | 1->2->4->5->6 |
| 10 | 7 | 1->2->4->5->7 |
| 11 | 6 | 8->4->5->6 |
| 11 | 7 | 8->4->5->7 |

101 - User Interface
102 - Encoder
103 - Decoder

301 - Host Switch Resolution
302 - Path Resolution

LAYER 2 PATH TRACING THROUGH CONTEXT ENCODING IN SOFTWARE DEFINED NETWORKING

RELATED APPLICATION INFORMATION

This application claims priority to provisional application No. 61/969,960 filed Mar. 25, 2014, entitled "Method and Apparatus for Layer 2 Path Tracing through Context encoding in Software Defined networking", the contents thereof are incorporated herein by reference.

BACKGROUND OF THE INVENTION

The present invention relates generally to software defined networks, and more particularly, to layer 2 path tracing through context encoding in software defined networks.

Software-Defined Networking (SDN) allows network management much more flexible by decoupling the control plane where forwarding decisions are made from the data plane where forwarding actually happens. Network administrators can simply manage networks through abstractions of lower-level functionality. There can be one or more network controllers sitting in the control plane responsible for translating network administrators' abstracted policies into lower-level configurations that are subject to enact by switches. Although such abstraction hides the complexity underneath to network administrators, the ability for network administrators to verify whether switches' enaction agrees with their intended policies is a required feature in SDN troubleshooting.

The present invention focuses on a specific aspect of network troubleshooting in SDN, path tracing. Path tracing is the operation for determining the actual Layer 2 path taken by a given packet. Path tracing is important for network operators in carrying out performance optimization, e.g., comparing various routing options in load balancing, routing validation, e.g., ensuring that a routing algorithm performs correctly, and resource allocation e.g., identifying hot and cold spots in networks.

Currently, network operators rely on several approaches to determine the Layer 2 path of a packet, but to our best knowledge, all of them too much rely on the control plane, rather than determining the actual forwarding behavior in the data plane.

Referring to reference [1] below, ndb is a network debugger for SDN which emits postcards from every switch that the traced packet traverses. A postcard is a logging packet that contains information about the traced packet and the flow entry it matched. The network controller collects all postcards and reconstructs the packet path. The concern of that approach is the overhead of logging added to the control plane.

In Layer 3, hash-based IP traceback techniques, see reference [2] below, store packet digests on routers and use them to reconstruct the path of a packet. Extending such approach to Layer 2 comes with the expense of additional instrumentation on switches.

[1] Handigol, N., Heller, B., Jeyakumar, V., Mazi_eres, D., and McKeown, N. Where is the debugger for my software-de_ned network? In *Proceedings of the First Workshop on Hot Topics in Software Defined Networks* (New York, N.Y., USA, 2012), HotSDN '12, ACM, pp. 55 {60.

[2] Snoeren, A. C., Partridge, C., Sanchez, L. A., Jones, C. E., Tchakountio, F., Kent, S. T., and Strayer, W. T. Hash-based ip traceback. In *Proceedings of the 2001 Conference on Applications, Technologies, Architectures, and Protocols for Computer Communications* (New York, N.Y., USA, 2001), SIGCOMM '01, ACM.

Accordingly, there is a need for a solution to implement an SDN Layer 2 path tracing utility.

BRIEF SUMMARY OF THE INVENTION

The invention is directed to a controller configured with instructions for path tracing in a software defined network. The controller includes layer 2 path tracing in a software defined network for troubleshooting the network, the path tracing includes a user interface for taking an input of paths of interest to trace or a path identification in a header of a received packet, an encoder for receiving the input and generating a set of control messages to switches in the network that will stamp the packets traversing the traced paths with compact identification information and a corresponding codebook for decoding, and a decoder for using the codebook output by the encoder to translate the path identification information into hop-by-hop information.

In a similar aspect of the invention, there is provided a non-transitory storage medium with instructions to enable a computer implemented method for network monitoring that includes providing layer 2 path tracing in a software defined network for troubleshooting the network, the path tracing includes taking, by way of a user interface, an input of paths of interest to trace or a path identification in a header of a received packet, receiving, by an encoder, the input and generating a set of control messages to switches in the network that will stamp the packets traversing the traced paths with compact identification information and a corresponding codebook for decoding, and using, by a decoder, the codebook output by the encoder to translate the path identification information into hop-by-hop information.

In a further similar aspect of the invention, a method implemented by a computer with instructions for path tracing in a software defined network, the method includes providing layer 2 path tracing in a software defined network for troubleshooting the network, the path tracing includes taking, by way of a user interface, an input of paths of interest to trace or a path identification in a header of a received packet, receiving, by an encoder, the input and generating a set of control messages to switches in the network that will stamp the packets traversing the traced paths with compact identification information and a corresponding codebook for decoding, and using, by a decoder, the codebook output by the encoder to translate the path identification information into hop-by-hop information.

These and other advantages of the invention will be apparent to those of ordinary skill in the art by reference to the following detailed description and the accompanying drawings.

DETAILED DESCRIPTION

The present invention is directed to implement a SDN Layer 2 path tracing utility, called PathTracer. To guarantee the correctness, PathTracer re-uses some octets in the packet header to carry the path information along the forwarding. To achieve this, PathTracer can utilize the control plane to install flow table entries on switches, and then these switches encode their imprints when packets are traversing through.

However, just a few bits are not sufficient to differentiate paths, and a challenge of scalability still remains. To address these issues, PathTracer distributes flow table entries to a small set of switches corresponding to only the paths of interests. As path encoding happens in the data plane, the overhead that PathTracer introduces to the control plane is only limited by the number of switches on the paths of interests. Once the packet is arrived at the destination, PathTracer simply decode the path information to determine the actual path of a traced packet from the packet's header.

Figure 1:
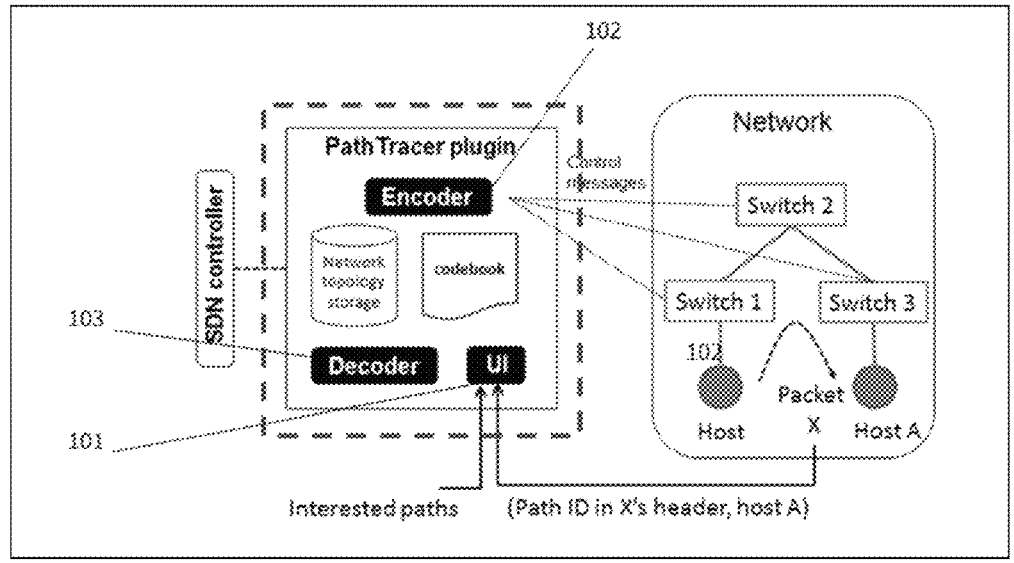
FIG. 1 shows a configuration for path tracing, in accordance with the invention.

FIG. 1 shows the architecture of the invention—PathTracer for SDN Layer 2 path tracing. The flow chart is explained in details as follows.

The user interface UI, 101, takes as input the interested paths to trace, or the path ID in the header of a received packet at some host, and forwards it to the encoder or decoder components accordingly.

The encoder 102 generates the set of control messages to switches that will stamp the packets traversing the traced paths with compact path ID information, and the corresponding codebook for decoding;

The decoder 103 uses the codebook output by the encoder to translate the path ID information into actual hop-by-hop path information.

Referring again to the user interface UI, 101, the UI provides two kinds of interactions to users: path tracing, where users input a set of L2 paths, and path query, where users input a path ID encoded in a packet, the host where the packet is received, and the time when the packet is received. For path tracing, the UI forwards the user input to the encoder. For path query, the UI forwards the user input to the decoder, and returns to user the full path information from the decoder. An example L2 network with 7 paths to be traced is shown below in FIG. 2.

Figure 3:
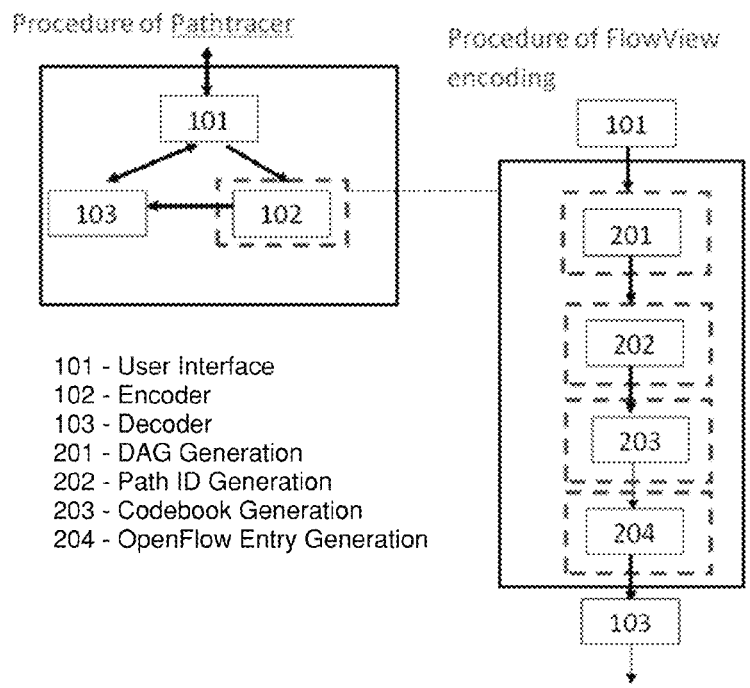
FIG. 3 is a diagram of the path tracing encoding, in accordance with the invention.

FIG. 3 details the PathTracer encoding procedure. The references 101, 102 and 103 refer to the elements first shown in FIG. 1. The remaining block elements 201-204 are detailed below.

Block element 201, is the directed acyclic graphs DAG generation. After a necessary sanity check on the validity of the interested paths, the encoder builds a forest of directed acyclic graphs (DAGs) by composing the valid paths. On each DAG, the encoder creates a virtual root node, and adds a link from it to all the nodes with 0 in degree.

Figure 2:
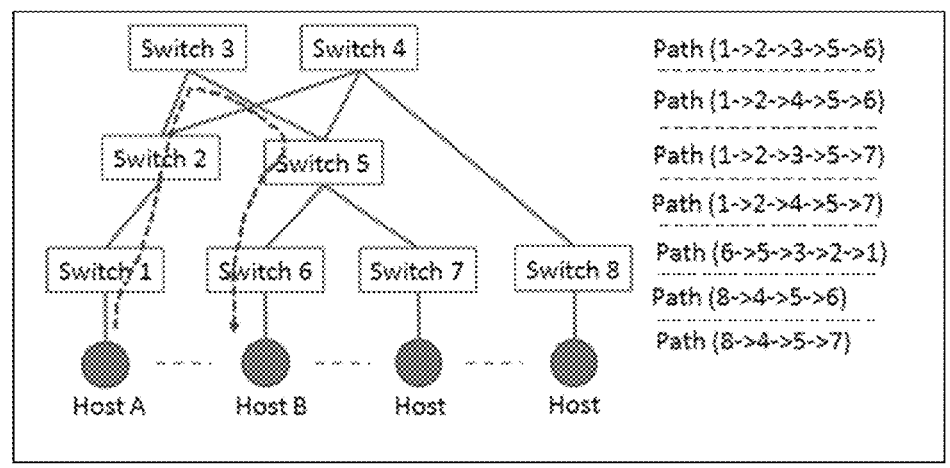
FIG. 2 shows an example of an L2 network with 7 paths to be traced by the inventive path tracing shown in FIG. 1.
Figure 4:
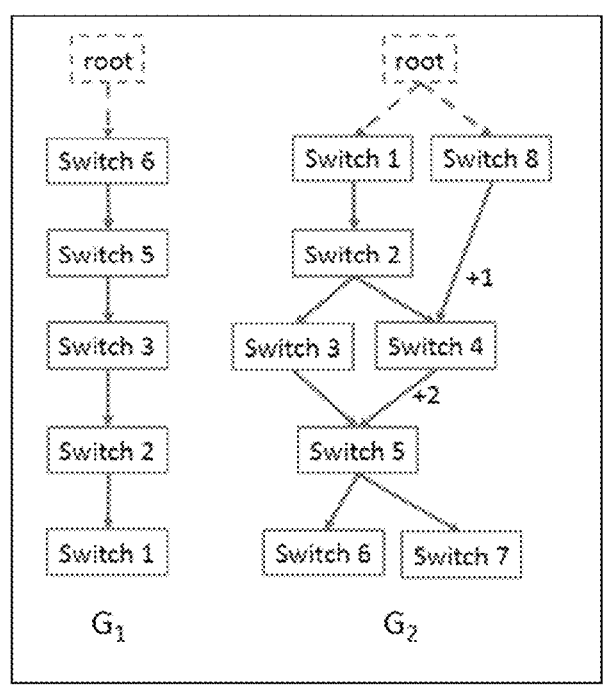
FIG. 4 is a diagram of a directed acyclic graph DAG example on 7 paths to be traced by the inventive path tracing.

The 2 DAGs constructed from the 7 paths in FIG. 2 are shown in FIG. 4. G1 contains the path 6->5->3->2->1, while G2 contains the rest of the 6 paths.

Block element 202 refers to the Path ID generation and comprises 2 aspects, 202.*a* and 202.*b*. On each DAG, the encoder applies the following procedure to generate the IDs of the included paths:

202.*a* the procedure traverses the nodes in the topological order, and computes the path number (PN) for each edge. With respect to each node n, the PN value for the first incoming edge is 0; for each of the rest edges e: (p->n) the PN value is the sum of the possible paths from the virtual root note top.

202.*b* the procedure applies a depth-first search on the DAG, and outputs the path ID when reaching an ending node for any traced path, and the ID is the sum of the PNs of all the edges from the virtual root node to that node.

For example, $G_2$ in FIG. 4 has all 0-PN edges except e: (8->4) and e: (4->5). The ID of Path 8->4->5->6 is therefore (1+2+0)=3 (11 in binary).

Block element 203 refers to the codebook generation part. With the 202 output, the encoder compiles a codebook for the traced paths. The codebook includes four fields: the time period T when the path IDs are valid, path IDs, the sites of the last switches before packets forwarded to hosts, and the full path information.

Figures 5, 6:
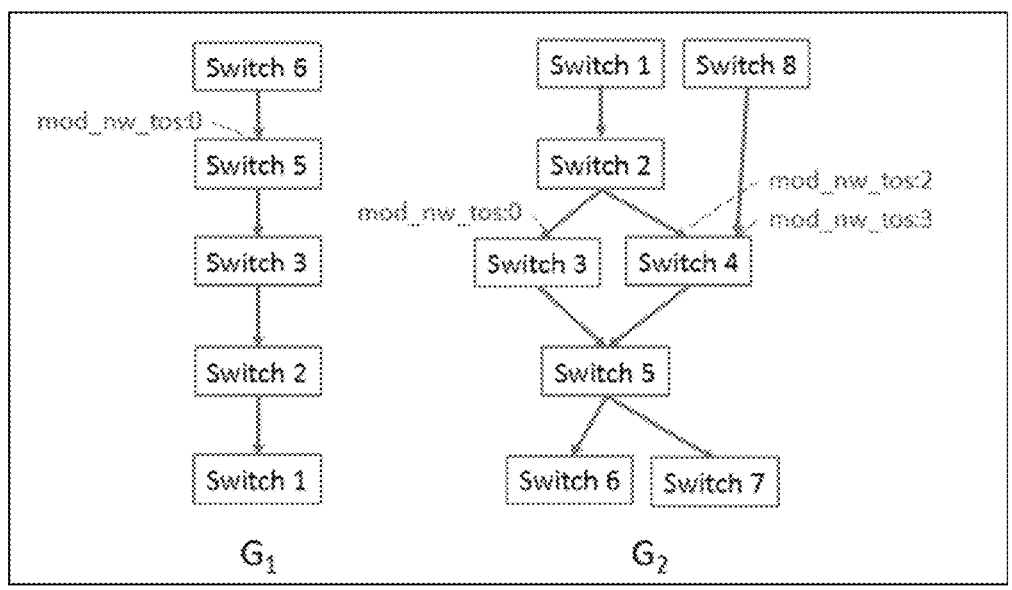
FIG. 5 is a codebook example on 7 paths to be traced by the inventive path tracing.
FIG. 6 shows 4 flow table entries for tracing the 7 paths in FIG. 2.

The code book for the 7 traced paths in FIG. 2 is shown in FIG. 5.

Block element 204 refers to the OpenFlow switch flow table entry generation. After computing the path IDs, the encoder will generate control messages for all switches in the DAGs to enable online path tracing. There are 3 types of ingress ports on a switch in the DAGs for path tracing: (a) a port that no traced path traverses into, (b) a port that all traced paths traversing into it share the same ID value, and (c) a port that there are more than one IDs of the traced paths traversing into it. The OpenFlow switch flow table entry generation comprises aspects 204.*a*, 204.*b* and 204.*c*, detailed below.

204.*a* For an ingress port of type (a), switch i needs to set the path ID field as the default no path value ID(NULL). For example, when we choose to use upper 6 bits in the type of service (ToS) field to carry the path ID information, the encoder will add a flow table entry in switch i so that a packet arriving at such ingress port will be applied the action of modifying its ToS field as the value ID(NULL). When ID(NULL) is chosen as the field default value (e.g., 0 for ToS) and modifications on such fields will only be caused by path tracing, the control messages and the resulting table entries for the type (a) ingress ports may be waived.

204.*b* For an ingress port of type (b), switch i needs to set the path ID field as the unique path ID value ID(X). For example, the encoder will add a flow table entry in switch i so that a packet arriving at such ingress port will be applied the action of modifying its ToS field as the value ID(X). As an optimization, the encoder will do a depth-first search from the virtual root node, and find the first switch i in every path whose incoming link has only the paths with ID(X) traverses into; only i on that path will be added with the table entry for ID(X) setting.

The 4 flow table entries for tracing the 7 paths are shown in FIG. 6. For path 6->5->3->2->1, only switch 5 needs to add a table entry for the path ID 0, as the ingress port of switch 5 connecting switch 6 is type (b) and is the first such ingress port along the path. Similarly, the ingress port on switch 3 (connecting switch 2) is type (b) for 2 paths with ID 0, the ingress port on switch 4 (connecting switch 2) is type (b) for 2 paths with ID 2, the ingress port on switch 4 (connecting switch 8) is type (b) for 2 paths with ID 3;

switch 3 and 4 are the first switches having type (b) ports along those paths. Actually, these 4 flow table entries are the only ones that the encoder needs to create for the 7 paths if we reserve 0 for the default value ID(NULL) and replace the 3 paths with ID 0 by the value 1.

204.c For an ingress port of type (c), the encoder will first check that among the traversing paths, whether any path traverses an ingress port of type (b) anywhere; for such paths, they will be removed from the path set. If the path set becomes empty after the checking, no flow table entries require to be added for this port. Otherwise, the encoder will add a set of entries to realize the ID addition operations if the PN value of the edge e ending at this port is not 0. In that case, the encoder will search the path from the virtual root node to the switch i for all the non-0 PN values excluding PN(e); for each possible combination of those PN values and value 0, a table entry is created so that a packet arriving at the ingress port with ToS field equal to the sum of the combination, it will be applied the action of modifying its ToS field as the sum of the combination and PN(e).

Figure 7:
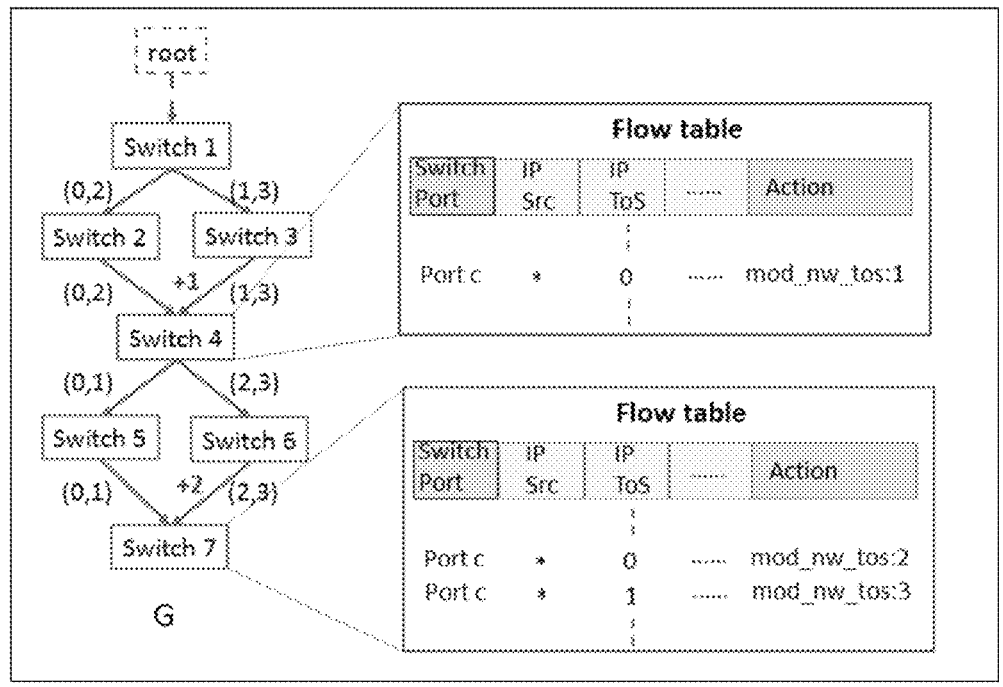
FIG. 7 is an example of type (c) ingress ports and the corresponding flow table entries, in accordance with the invention.

An example of type (c) ingress ports and the corresponding flow table entries are shown in FIG. 7. FIG. 7 shows 4 paths for tracing and its DAG. Described in 202, the offline encoding algorithm will assign the paths IDs (0,1,2,3), and all edges with PN value 0 except the edge 3–>4 (PN=1) and 6–>7 (PN=2). For convenience, we also label each edge with the path IDs traversing it. As all the 4 paths do not traverse any type (b) ingress ports, the encoder will create flow table entries in switches 4 and 7 which have incoming edges with non-zero PN. For switch 4, only one entry is created to stamp the ToS field with the PN value 1. For switch 7, two entries are created for the PN combinations of (1; 0) and 0, and accordingly stamp ToS field with the value (1+0+2)=3 and (0+2)=2.

Figure 8:
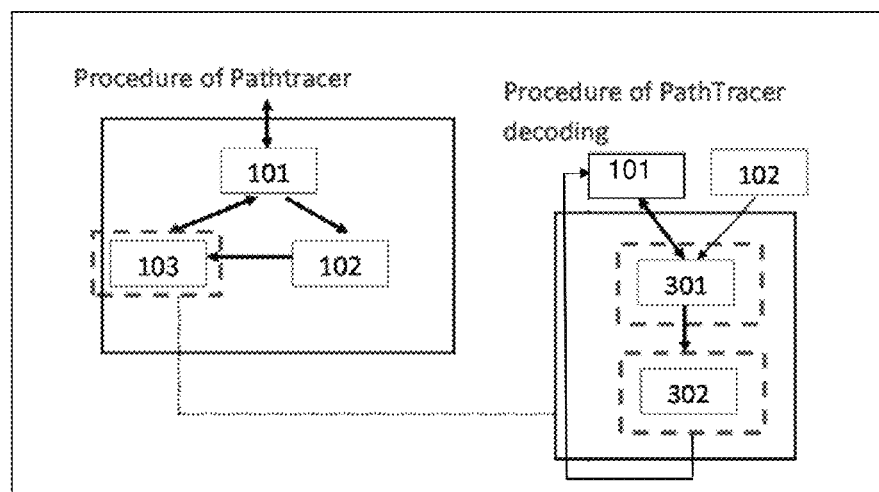
FIG. 8 details decoding for the path tracing in accordance with the invention.

FIG. 8 shows the details of the decoding procedure under the inventive PathTracer. The feature 301 refers to a host to switch resolution and feature 302 refers to a path resolution.

Referring to the host to switch resolution, 301, when a user sends a query on a path ID i encoded in a packet received at host x at time t, the decoder will first use the network topology information to resolve x to the switch (site) s where x is attached.

Referring to the path resolution, 302, the decoder will then lookup the codebook output by 203 with (t; i; s), and return the full path information matching the 3-tuple value.

The PathTracer invention may be implemented in hardware, firmware or software, or a combination of the three. It can be a plugin or module in a system or computer or the module can be self contained. Preferably the invention is implemented in a computer program executed on a programmable computer or a controller having a processor, a data storage system, volatile and non-volatile memory and/or storage elements, at least one input device and at least one output device. More details are discussed in U.S. Pat. No. 8,380,557, the content of which is incorporated by reference.

Figure 9:
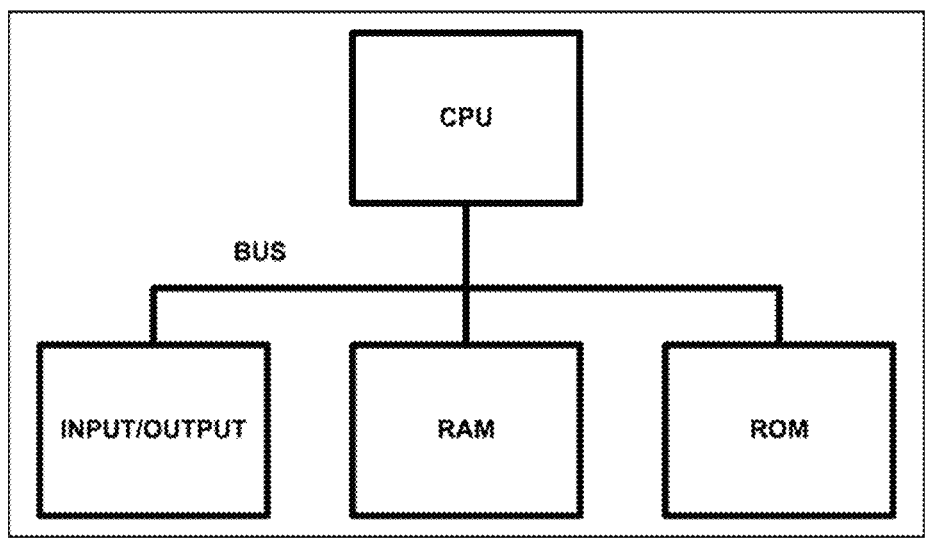
FIG. 9 is a diagram of an exemplary computer or controller for supporting the inventive path tracing.

By way of example, a block diagram of a computer or controller to support the invention is discussed next in FIG. 9. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present invention provides Monitoring and troubleshooting operational SDN networks can be a daunting task, due to their size, distributed state, and additional complexity introduced by network virtualization. The present invention provides a flexible and low-overhead on-demand packet tracing technology on the data plane which tells whether or not a network packet has taken the desired route. It can help operators/integrators to speed up diagnosing data-path routing problems, and enables new network visualization and traffic analysis. Such path tracing information is also important for network operators in carrying out performance optimization, e.g., comparing various routing options in load balancing, routing validation, e.g., ensuring that a routing algorithm performs correctly, and resource allocation, e.g., identifying hot and cold spots in networks.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A controller configured with instructions for path tracing in a software defined network, the controller comprising:

layer 2 path tracing in the software defined network for troubleshooting the network, the path tracing comprising:

a user interface for taking an input of paths of interest to trace or a path identification in a header of a received packet;

an encoder for receiving the input and generating a set of control messages to switches in the network that will stamp the packets traversing the traced paths with compact identification information and a corresponding codebook for decoding; and a decoder for using the codebook output by the encoder to translate the path identification information into hop-by-hop information wherein the user interface provides user interactions where users input a set of L2 paths, and a path query, where users input the path identification encoded in the packet, the host where the packet is received, and the time when the packet is received, for path tracing the user interface forwards the user input to the encoder and for path query the user interface forwards the user input to the decoder, and returns to the user the full path information from the decoder.

2. The controller of claim 1, wherein to achieve correct path tracing the path tracing re-uses some octets in the header of the packet to carry the path information along when forwarding to the encoder or decoder.

3. The controller of claim 1, wherein the path tracing comprises utilizing a control plane to install flow table entries on switches and then these switches encode their imprints when packets are traversing through.

4. The controller of claim 1, wherein the path tracing comprises to address that a few bits are insufficient to differentiate paths and a challenge of scalability the path tracing comprising distributing flow table entries to a small set of switches corresponding to only the paths of interest.

5. The controller of claim 4, wherein the path tracing comprises, as path encoding happens in a data plane, the overhead that path tracing introduces to a control plane is only limited by a number of switches on the paths of interests, once the packet arrives at the destination, the path information is decoded to determine the actual path of a traced packet from the packet's header.

6. The controller of claim 1, wherein the encoder comprises path identification generation where on each directed acyclic graph DAG the encoder, to generate the identifications of the included paths, 1) traverses nodes in a topological order, and computes a path number PN for each edge, with respect to each node n, the PN value for the first incoming edge is 0; for each of the rest edges e: (p->n) the PN value is the sum of the possible paths from a virtual root node top, and 2) applies a depth-first search on the DAG, and outputs the path identification when reaching an ending node for any traced path, and the identification is the sum of the PNs of all the edges from the virtual root node to that node.

7. The controller of claim 1, wherein the encoder comprises an open flow switch flow table entry generation where after computing the path identifications, the encoder generates control messages for all switches in directed acyclic graphs DAGs to enable online path tracing, there being 3 types of ingress ports on a switch in the DAGs for path tracing: (a) a port that no traced path traverses into, (b) a port that all traced paths traversing into it share the same identification value, and (c) a port that there are more than one identification of the traced paths traversing into it.

8. The controller of claim 7, wherein for an ingress port of type (a), the switch needs to set the path identification field as a default no-path value, for an ingress port of type (b), the switch needs to set the path identification field as the unique path identification value, and for an ingress port type (c) the encoder will first check among traversing paths, whether any path traverses an ingress port of type (b) anywhere; for such paths, they will be removed from the path set, if the path set becomes empty after the checking, no flow table entries need to be added for this port, otherwise, the encoder will add a set of entries to realize the identification addition operations if a path number value of the edge of a node ending at this port is not 0.

9. The controller of claim 1, wherein the decoder comprises a host to switch resolution and a path resolution, the host to switch resolution is for when a user sends a query on a path identification encoded in a packet received at host x at time t, the decoder will first use network topology information to resolve x to a switch s where x is attached, and the path resolution is for looking up the codebook output from the encoder with time, identification and switch information, and return the full path information matching a 3-tuple value.

10. A non-transitory storage medium with instructions to enable a computer implemented method for network monitoring that comprises:
providing layer 2 path tracing in the software defined network for troubleshooting the network, the path tracing comprising:
taking, by way of a user interface, an input of paths of interest to trace or a path identification in a header of a received packet;
receiving, by an encoder, the input and generating a set of control messages to switches in the network that will stamp the packets traversing the traced paths with compact identification information and a corresponding codebook for decoding; and
using, by a decoder, the codebook output by the encoder to translate the path identification information into hop-by-hop information;
wherein the encoder comprises an open flow switch flow table entry generation where after computing the path identifications, the encoder generates control messages for all switches in directed acyclic graphs DAGs to enable online path tracing, there being 3 types of ingress ports on a switch in the DAGs for path tracing: (a) a port that no traced path traverses into, (b) a port that all traced paths traversing into it share the same identification value, and (c) a port that there are more than one identification of the traced paths traversing into it.

11. The storage of claim 10, wherein to achieve correct path tracing the path tracing re-uses some octets in the header of the packet to carry the path information along when forwarding to the encoder or decoder.

12. The storage medium of claim 10, wherein the path tracing comprises utilizing a control plane to install flow table entries on switches and then these switches encode their imprints when packets are traversing through.

13. The storage medium of claim 10, wherein the path tracing comprises to address that a few bits are insufficient to differentiate paths and a challenge of scalability the path tracing comprising distributing flow table entries to a small set of switches corresponding to only the paths of interest.

14. The storage medium of claim 13, wherein the path tracing comprises, as path encoding happens in the data plane, the overhead that path tracing introduces to a control plane is only limited by a number of switches on the paths of interests, once the packet arrives at the destination, the path information is decoded to determine the actual path of a traced packet from the packet's header.

15. A method implemented by a computer with instructions for path tracing in a software defined network, the method comprising:
providing layer 2 path tracing in the software defined network for troubleshooting the network, the path tracing comprising:
taking, by way of a user interface, an input of paths of interest to trace or a path identification in a header of a received packet;

receiving, by an encoder, the input and generating a set of control messages to switches in the network that will stamp the packets traversing the traced paths with compact identification information and a corresponding codebook for decoding; and using, by a decoder, the codebook output by the encoder to translate the path identification information into hop-by-hop information;

wherein the decoder comprises a host to switch resolution and a path resolution, the host to switch resolution is for when a user sends a query on a path identification encoded in a packet received at host x at time t, the decoder will first use network topology information to resolve x to a switch s where x is attached, and the path resolution is for looking up the codebook output from the encoder with time, identification and switch information, and return the full path information matching a 3-tuple value.

16. A method implemented by a computer with instructions for path tracing in a software defined network, the method comprising:

providing layer 2 path tracing in the software defined network for troubleshooting the network, the path tracing comprising:

taking, by way of a user interface, an input of paths of interest to trace or a path identification in a header of a received packet;

receiving, by an encoder, the input and generating a set of control messages to switches in the network that will stamp the packets traversing the traced paths with compact identification information and a corresponding codebook for decoding; and using, by a decoder, the codebook output by the encoder to translate the path identification information into hop-by-hop information;

wherein the encoder comprises an open flow switch flow table entry generation where after computing the path identifications, the encoder generates control messages for all switches in directed acyclic graphs DAGs to enable online path tracing, there being 3 types of ingress ports on a switch in the DAGs for path tracing: (a) a port that no traced path traverses into, (b) a port that all traced paths traversing into it share the same identification value, and (c) a port that there are more than one identification of the traced paths traversing into it.

* * * * *